United States Patent

[11] 3,534,815

| [72] | Inventor | Jakob Kagi |
| | | Wiesendangen Zurich, Switzerland |
| [21] | Appl. No. | 689,068 |
| [22] | Filed | Dec. 8, 1967 |
| [45] | Patented | Oct. 20, 1970 |
| [73] | Assignee | Sulzer Brothers, Ltd. |
| | | Winterthur, Switzerland |
| | | a corporation of Switzerland |
| [32] | Priority | Dec. 9, 1966 |
| [33] | | Switzerland |
| [31] | | 17,648/66 |

[54] VAPOR GENERATOR HAVING TUBE COILS AT DIFFERENT ELEVATIONS AND PRESSURE REDUCING MEANS FOR REDUCING PRESSURE INDEPENDENTLY OF THE RATE OF FLOW
7 Claims, 6 Drawing Figs.

[52] U.S. Cl. .................................................. 165/174,
122/406, 137/110
[51] Int. Cl. ..................................................... F28f 13/08
[50] Field of Search ........................................ 165/174;
137/110; 122/406, (R)

[56] References Cited
UNITED STATES PATENTS

| 1,137,137 | 4/1915 | Heaton.................... | 122/406X |
| 2,013,829 | 9/1935 | Keenan.................... | 122/406X |
| 2,288,297 | 6/1942 | Naiman.................... | 165/174X |

FOREIGN PATENTS

| 786,325 | 11/1957 | Great Britain............ | 122/406 |
| 900,203 | 7/1962 | Great Britain............ | 165/174 |

Primary Examiner—Robert A. O'Leary
Assistant Examiner—Albert W. Davis, Jr.
Attorney— Kenyon & Kenyon, Reilly, Carr & Chapin ABSTRACT: The tube coils are arranged at different elevations with the lower tube coils provided with pressure reducers to cause a pressure drop in the lower tube coils to compensate for the difference in hydrostatic pressures due to the elevational differences. The pressure reducers are constructed on the Rotameter principle so that the pressure drop is independent of the rate of flow.

Patented Oct. 20, 1970 3,534,815
Sheet 1 of 3
Fig. 1
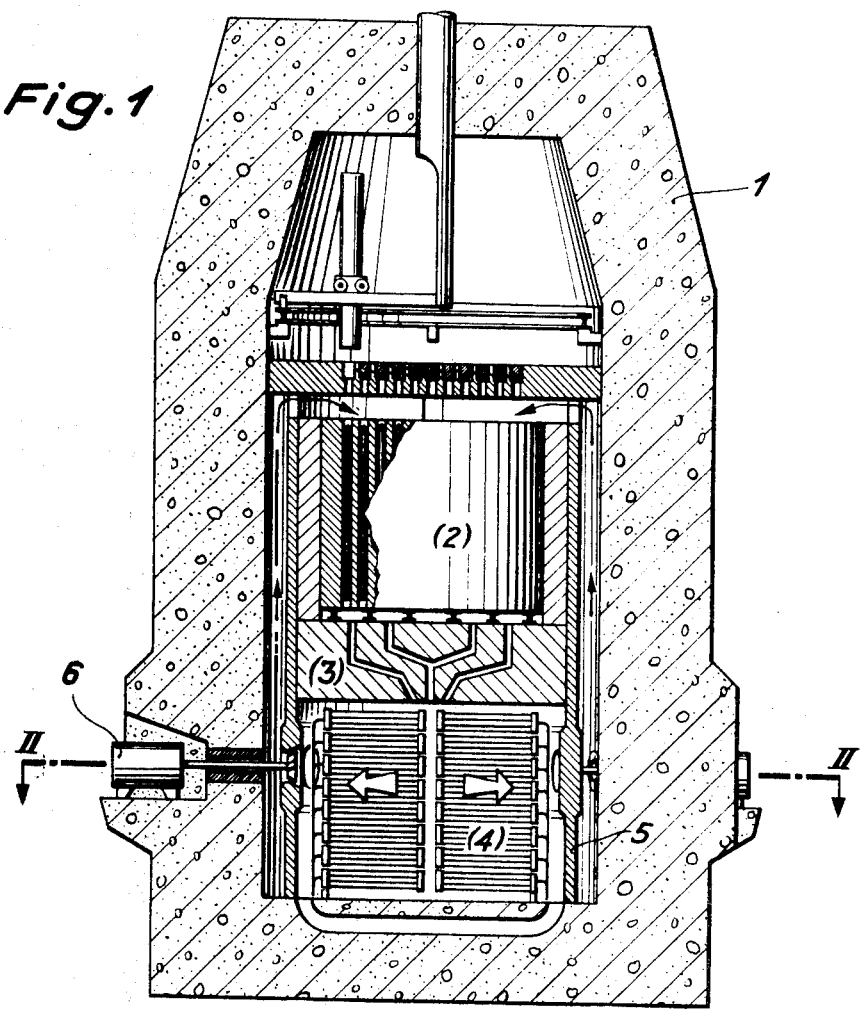
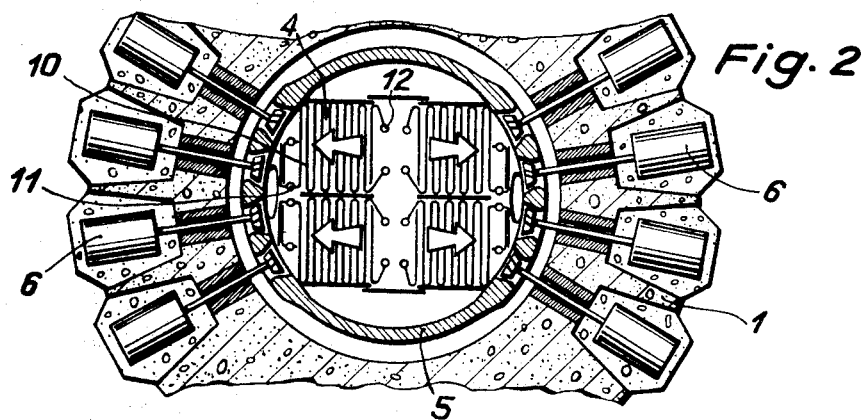
Fig. 2
Inventor:
JAKOB KAGI
BY
Kenyon & Kenyon
ATTORNEYS

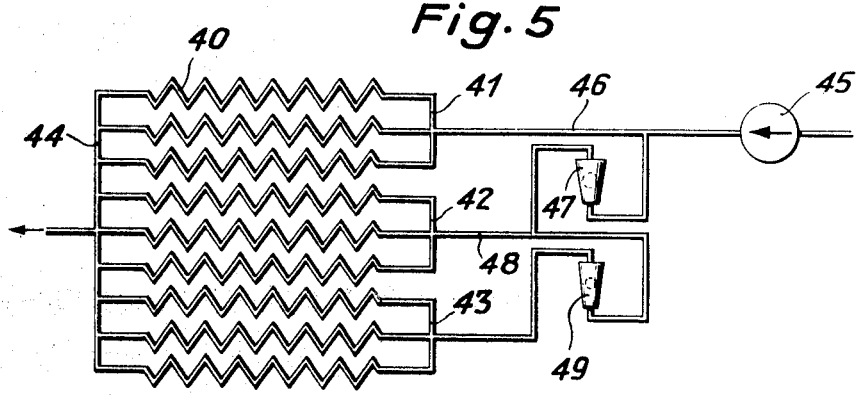
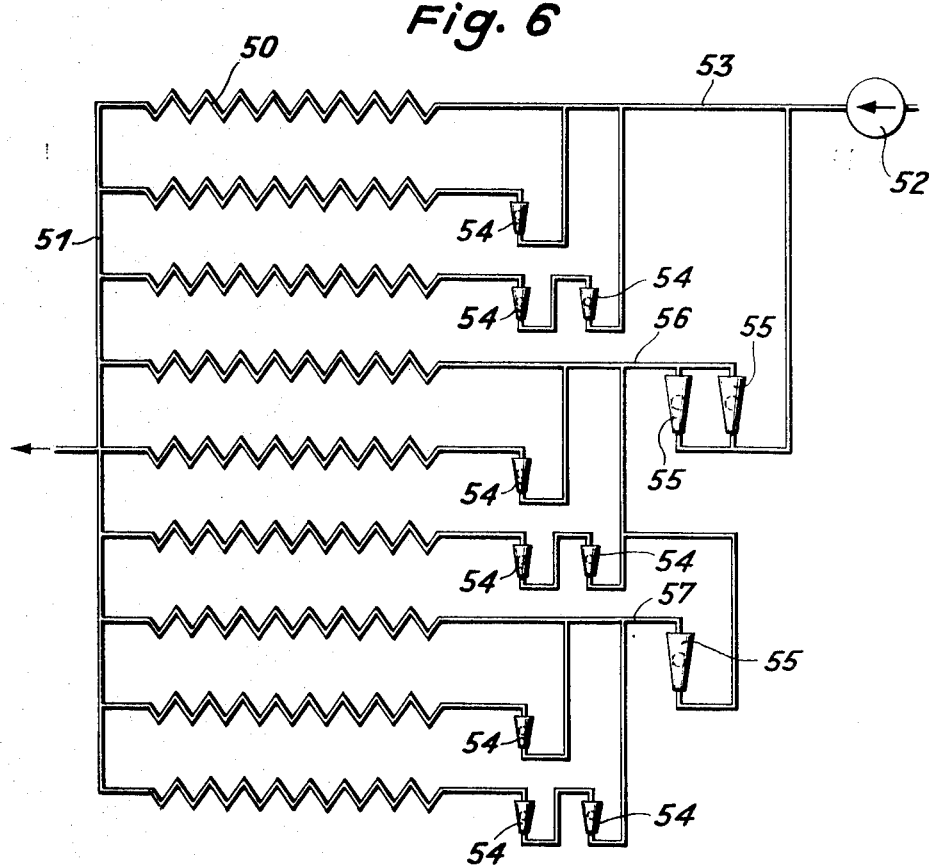

VAPOR GENERATOR HAVING TUBE COILS AT DIFFERENT ELEVATIONS AND PRESSURE REDUCING MEANS FOR REDUCING PRESSURE INDEPENDENTLY OF THE RATE OF FLOW

This invention relates to a vapor generator. More particularly, this invention relates to a vapor generator for a nuclear reactor plant. Still more particularly, this invention relates to a vapor generator having tube coils disposed at different elevations.

It has been known to provide nuclear reactor plants with vapor generators such as steam generators in order to cool a heat transfer medium passing from a nuclear reactor. Such vapor generators have had a plurality of tube coils constituting an evaporator connected in parallel for conducting flows of working medium therethrough in an opposite direction to the flow of heated heat transfer medium from the reactor in order to evaporate the working medium to vapor. Generally, it has been proposed to have the evaporation zones of the tube coils disposed at different horizontal levels within the generator in a plurality of superjacent layers and to have the tube coils supplied along manifolds with fluid working medium from a common feed pump. In this proposal, the vapor produced in the tube coils is drawn off through headers connected to the tube coils. By disposing the tube coils horizontally, a better utilization of the available space than otherwise possible is obtained along with lower flow resistances of the working medium and the heat-dissipating heat transfer medium.

However, in high capacity installations the heretofore arrangements have had the disadvantage that the working medium on the supply side of the tube coils in the various levels has been affected by different hydrostatic pressures while, because of the lower density on the vapor side, these pressures have had less effect on the vapor side. Consequently, there has been a greater pressure difference along the lower tube coils than along the higher tube coils. Therefore, especially at low load, there can be large differences in the distribution of the working medium to the various tube coils which can lead to overheating of individual tube coils.

In order to improve the stability of the mass distribution in parallel tube coils, it has been known to insert throttling devices with floating throttling members in the tube coils. Each throttling member is mounted on a support within a cylindrical tube on a stop up to a certain limiting rate of flow in spaced relation to the tube walls to provide a small flow cross-sectional area. When the limiting rate of flow is exceeded, the throttling member lifts from the support to expose a larger but constant flow cross-sectional area. This, then, is a throttling device having two different cross-sectional areas which switches automatically from one to the other at a given loading; however, it is not a pressure reducer with a pressure drop independent of the loading but rather is dependent on the flow rate. Such an automatic switching throttle is said to have the advantage of having a relatively strong stabilizing action at a low load without producing an uneconomically high pressure drop at a high load.

Accordingly, it is an object of the invention to compensate for differences in pressure caused by different static pressures in parallel tube coils.

It is another object of the invention to improve the mass distribution of a working medium into the parallel tube coils of a vapor generator.

It is another object of the invention to throttle the flows of working medium into the lower tube coils of a vapor generator in an amount to compensate for a drop in hydrostatic pressure due to a difference in elevation between the tube coils.

It is another object of the invention to produce a pressure drop in a tube coil independently of the rate of flow through a tube coil.

Briefly, the invention provides a vapor generator having horizontally disposed tube coils for conducting a flow of working medium with means for reducing the pressure in a flow of the working medium through each lower tube coil. This means is constructed as a pressure reducer wherein the pressure drop across the pressure reducer is substantially independent of the rate of flow. The pressure reducers are incorporated in the lower tubes so that the pressure drops across the heated portions of the various tube coils are assimilated to one another.

The pressure reducers serve to compensate for differences in static pressures between adjacent parallel tube coils of different elevations by being inserted in the mass flow of the working medium such that the mass distribution of the working medium is stabilized across the tube coils. Each pressure reducer is constructed with a conical tube for conducting a flow of working medium and with a throttling element in the form of a float which is mounted on a support in the conical tube in spaced relation to the walls of the conical tube in order to provide a small cross-sectional area for throttling the flow of working medium.

In one embodiment, the tube coils of a vapor generator are arranged in a plurality of elevations with the tube coils in adjacent levels combined by a common distributor preceded by a pressure reducer. In this embodiment, only a relatively small number of pressure reducers is required.

In another embodiment, in order to obtain larger pressure drops, two or more pressure reducers are arranged in series. This requires a smaller number of pressure reducer types and, in some circumstances, a single type can suffice. Advantageously, the dimensions of the pressure reducers in this case are such that a constant pressure drop prevails over the heated portion of the individual tube coils during operation.

Preferably, the pressure reducer is constructed on the "Rotameter" principle. In this way, a pressure drop independent of the rate of flow can be obtained very simply and very reliably.

These and other objects and advantages of the invention will become more apparent from the following detailed description and appended claims taken in conjunction with the accompanying drawings in which:

FIG. 1 illustrates a cross-sectional view through a nuclear reactor plant incorporating a vapor generator having horizontal tube coils in accordance with the invention;

FIG. 2 illustrates a view of line II—II of FIG. 1;

FIG. 5 illustrates a modified arrangement of the tube coils of the vapor generator according to the invention; and FIG. 6 illustrates another modified arrangement of the tube coils and pressure reducers according to the invention.

Figure 3:
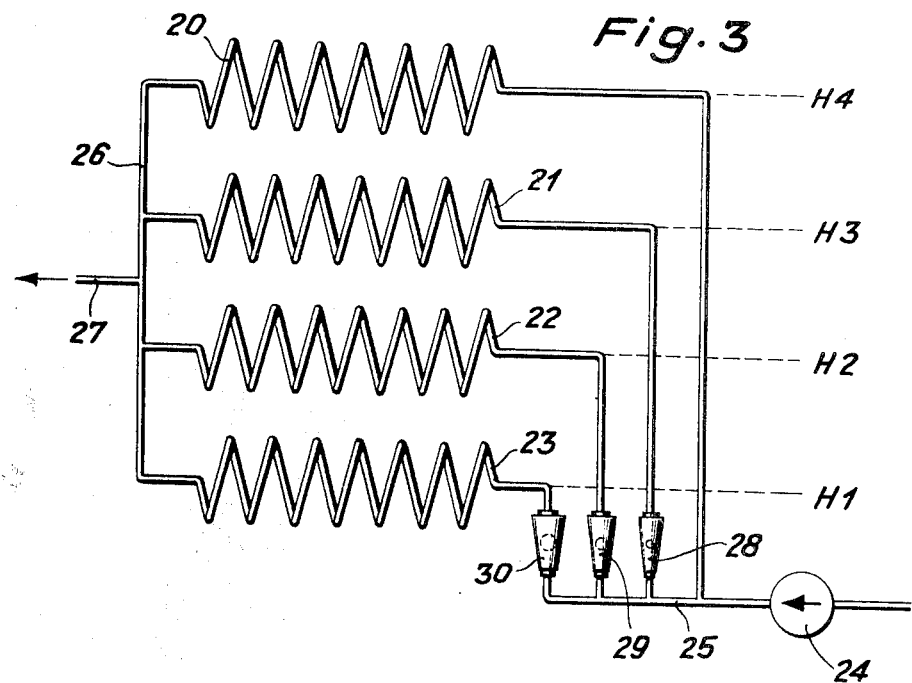
FIG. 3 illustrates a simple flow diagram for the vapor generator of FIG. 1.

Referring to FIG. 1, the nuclear reactor plant has a pressure vessel 1 which houses a nuclear reactor 2 and a vapor generator 4 in spaced relation within a cylindrical wall 5, the reactor 2 and generator 4 being separated from each other by shielding 3. In addition, blowers 6 are arranged in the pressure vessel 1 to circulate a heat transfer medium through the reactor 2 and generator 4 and along the outside of the cylindrical wall 5.

Referring to FIG. 2, the vapor generator 4 includes vapor generator units which are spaced about a central distribution chamber. Each generator unit is composed of stacked horizontally disposed tube coils 10 which are connected at the inlet end to distributors 11 and at the outlet end to headers 12. The heat transfer medium, for example, a gas, is directed to flow from the central distribution chamber across the tube coils in a horizontal direction in a heat transfer relation.

Referring to FIG. 3, wherein the tube coils of a vapor generator unit are shown in a simple flow diagram, the individual tube coils 20, 21, 22, 23 of a generator unit are disposed on different horizontal levels H1, H2, H3, H4. A working medium is supplied to the tube coils 20—23 by a common feed pump 24 by way of a distributor 25 corresponding to the above distributor 11 of FIGS. 1 and 2 and is drawn off through a common header 26, corresponding to the above header 12 of FIGS. 1 and 2, and a tube 27. The uppermost tube coil 20 is connected directly to the distributor 25 while each of the lower tube coils 21—23 are connected through a pressure reducer 28, 29, 30 to the distributor 25.

Figure 4:
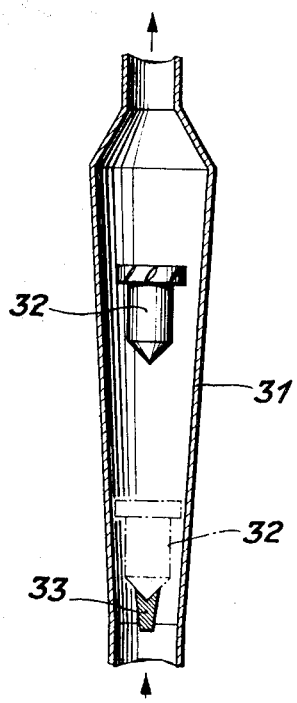
FIG. 4 illustrates a cross-sectional view of a pressure reducer according to the invention.

Referring to FIG. 4, each pressure reducer is constructed on the principle of a "Rotameter", as used, for example, in measuring a flow of fluid. Each pressure reducer has a conical tube 31 disposed in the flow of working medium which contains a float element 32. The float element 32 is sized relative to the conical tube 31 to float within the tube 31 under the influence of a flow of working medium. In order to prevent jamming of the float 32 in the conical tube in the absence of a flow of working medium, for example, during shut down of the plant, a support 33 is disposed near the lower end of the conical tube 31 to support the float 32 out of contact with the walls of the conical tube 31.

The construction of the pressure reducer is such that a pressure drop is caused in the flow of working medium which is substantially independent of the rate of flow while being determined only by the weight and maximum diameter of the float element 32. In use, depending on the rate of flow which is allowed for in the width of the conical tube 31, the float element 32 becomes set at a given level within the conical tube 31. At this level, a state of equilibrium becomes established between the pressure drop produced in the pressure reducer and the excess pressure acting on the float element. In order to maintain this equilibrium, the flow cross section between the float element 32 and the wall of the conical tube 31 adjusts by means of a rise or fall of the float element. Therefor, for a given float element diameter, the weight of the float element must be suitably selected in order to produce the desired pressure drop independent of the rate of flow.

Referring to FIG. 3, the weights of the float elements in each pressure reducer are selected so that the differences in the hydrostatic pressures at the respective levels H1 to H4 are compensated for by means of the respective pressure drops across the pressure reducers. That is, for higher hydrostatic pressures, the weight of a float element increases as illustrated by the differences in diameters of the dashed circles inside the pressure reducers.

It is assumed that the density of the vapor in the header 26 is negligible compared with the density of the water in distributor 25. If not, this density must be allowed for, for example, according to the formula:

$$\Delta P_{28} = (H4 - H3)(\gamma 25 - \gamma 26)$$

In this formula, $\Delta P_{28}$ is the pressure drop in the pressure reducer 28 and $\gamma_{25}$ and $\gamma_{26}$ the specific gravities of the media in the distributor 25 and header 26, respectively. The pressure drops in the individual pressure reducers are adapted to obtain a uniform distribution of the working medium to the various tube coils at all loads, i.e. at all rates of working medium flow.

Referring to FIG. 5, where the generator units have sets of tube coils 40, for example, sets of three, disposed on different horizontal levels, such that the neighboring tube coils have slight negligible differences in level, the sets are combined into groups. In addition, the tube coils of each set are connected to a common distributor 41, 42, 43. However, all the tube coils are connected to a common header 44 at the exit end for the withdrawal of the vapor produced within the tube coils. In addition, a feed pump 45 supplies working medium from a distributor 11 as in FIGS. 1 and 2 to a main distributor tube 46 leading directly to the highest distributor 41. The distributor 42 for the next lower group of tube coils is connected to the main distributor tube 46 over a pressure reducer 47, constructed as above, and a tube 48 leading from the pressure reducer 47. The distributor 43 of the lowest group of tube coils is connected to the tube 48 over another pressure reducer 49.

In operation, this embodiment is able to operate with a smaller number of pressure reducers than that above. Also, as the distributor 43 of the lowermost group in which the working medium subjected to the greatest pressure reduction flows is connected to two pressure reducers arranged in series, these two pressure reducers 47, 49 can be of the same structure provided the first pressure reducer 47 can pass the working medium flow for the two sets of tubes.

Referring to FIG. 6, where the vapor generator units have tube coils 50 arranged in a plurality of levels one above the other and connected to a common header 51, the tube coils are connected to a common distributor 53 over various combinations of pressure reducers. For example, with a feed pump 52 supplying working medium in a manner as above, the common distributor 53 leads directly to the uppermost tube coil. The next lower tube coil is connected to the common distributor 53 over a single pressure reducer 54 whereas the next lower tube coil is connected to the common distributor over a pair of pressure reducers 54 arranged in series. The next lower tube coil (the fourth from the top as illustrated) is connected to the common distributor 53 over a pair of pressure reducers 55 arranged in parallel and a tube 56 leading from these pressure reducers 55. These pressure reducers 55 are constructed for a higher rate of flow as well as for three times the pressure drop of the pressure reducers 54 in the upper tube coils. The next lower tube coil is connected to the tube 56 over a pressure reducer 54 which is constructed in a manner as the pressure reducers for the tube coils of the three uppermost tube coils as indicated by like reference number. The next lower tube coil (the sixth from the top) is connected to the tube 56 over a pair of pressure reducers 54 arranged in series in a similar manner as the third lower tube coil is connected to the common distributor 53. The next lower group of tube coils is connected to the tube 56 over a single pressure reducer 55, as above. The upper tube coil of this group is connected by a tube 57 to the pressure reducer 55 while the next lower tube coil is connected over a single pressure reducer 54 to the tube 57 and the lowest tube coil is connected over a pair of pressure reducers 54 arranged in series to the tube 57.

Thus, the pressure of the working medium flowing into the lower tube coils is reduced by the respective pressure reducers to compensate for the decrease in pressure occuring with an increase in elevation of the upper tube coils so that each of the lower tube coils receive a flow of working medium at substantially the same pressure as the uppermost tube coil.

It is noted that with this latter arrangement, that the types of pressure reducers 54, 55, designed for two different flow rates and pressure drops, are sufficient. It is also noted that an arrangement of two like pressure reducers in series, double the pressure drop; whereas, an arrangement in parallel, produces the same pressure drop but doubles the possible rate of flow.

Obviously, various other arrangements of the tube coils and pressure reducers than those described above based on the principle of the invention are possible. For example, instead of using a pressure reducer of the "Rotameter" type, a valve with a suitable regulating device can be used for the same purpose. However, "Rotameters" are simpler to use and usually are more reliable and lower in capital cost.

The invention thus provides a vapor generator having tube coils at different elevations wherein the pressure drops across each tube coil is assimilated to the others independently of the rates of flow so that the pressure drops across the heated portions of the tube coil are substantially equal to each other.

I claim:

1. In a vapor generator having a distributor and a plurality of tube coils for conveying a flow of working medium therethrough connected in parallel relation to said distributor, said tube coils being disposed at different elevations with respect to each other, pressure reducing means interconnected to the lower tube coils of said plurality of tube coils upstream of the tube coils for reducing the pressure in the flow of working medium flown through said lower tube coils independently of the rate of flow therethrough whereby the pressure drops across said tube coils are assimilated to one another.

2. A vapor generator as set forth in claim 1 wherein said tube coils are arranged in a plurality of sets of tube coils, each set of tube coils having a common distributor and a number of tube coils connected in parallel to said common distributor, the common distributor of the uppermost set of tube coils being connected directly with said distributor, the common distributor of each lower set of tube coils being connected to at least one of said pressure reducing means upstream of said common distributor.

3. A vapor generator as set forth in claim 2 wherein the common distributor of a third set of said sets of tube coils from the top is connected to a pair of said pressure reducing means upstream of said common distributor, said pair of pressure reducing means being connected in series to increase the pressure drop in said third set of tube coils over the pressure drop in the upper sets of tube coils.

4. A vapor generator as set forth in claim 1 wherein said tube coils are arranged in a plurality of levels one above the other, the uppermost tube coil being connected directly to said distributor and the lower tube coils being connected to at least one of said pressure reducing means upstream of said tube coils, a third tube coil of said tube coils from the top being connected to a first pair of said pressure reducing means arranged in series upstream thereof, the remaining lower tube coils being connected to at least a second pair of pressure reducing means arranged in parallel upstream thereof.

5. A vapor generator as set forth in claim 4 wherein said second pair of pressure reducing means is constructed for a higher rate of flow therethrough than said first pair of pressure reducing means.

6. A vapor generator as set forth in claim 1 wherein said pressure reducing means includes a conical tube for directing a flow of working medium therethrough, a support secured in the narrower end of said tube, and a float element seated on said support in spaced relation to said conical tube for upward movement from said support towards the wider end of said tube under a flow of working medium to increase the flow cross-sectional area between said float element and said conical tube whereby the weight of said float element is adapted to effect a predetermined pressure drop independent of the rate of flow of working medium.

7. A vapor generator as set forth in claim 1 wherein each of said tube coils is connected to a common header downstream thereof for withdrawal of produced vapor therefrom.